Patented Jan. 13, 1942

2,269,426

UNITED STATES PATENT OFFICE 2,269,426

FIRE EXTINGUISHING COMPOSITION AND METHOD

Fisher L. Boyd, West Chester, Pa.

No Drawing. Application January 26, 1938,
Serial No. 186,984

9 Claims. (Cl. 169—1)

This invention relates generally to fire extinguishing compositions and more particularly to such compositions as are capable, when combined with water, of producing a viscous foam non-supporting to combustion and which serves as a blanket to smother and so extinguish the flames produced by burning organic liquids having high capillary characteristics, such as alcohols, ethers, acetones, organic esters and the like.

Heretofore and prior to this invention, various foam-forming compositions have been employed more or less successfully to extinguish oil and gasolene fires. These compositions ordinarily comprise sodium bicarbonate and aluminum sulphate together with a stabilizing ingredient such as an extract of licorice or of oak bark to increase the surface viscosity of the gas bubbles formed when the composition is combined with water. It has been found preferable to introduce the acid and basic foam producing reagents into the water in the form of dry powders, the stabilizing ingredient being also of dry powdered form. In some systems the powdered sodium bicarbonate (the basic reagent), the powdered aluminum sulphate (the acid reagent) and the powdered stabilizer are commonly introduced into a single stream of water which conveys the instantly produced foam to the fire to be extinguished. In other systems, the dry powdered basic ingredient and the dry powdered acid ingredient are introduced into separate streams of water to form separate acid and basic solutions which are subsequently merged into a single stream whereupon the foam is produced as a product of the reaction, the stabilizer being introduced into one or the other of the streams of water together with the acid or the basic reagent.

While the foam produced and applied to the fire in the manner above described is quite effective in extinguishing oil, gasoline and like fires, experience has demonstrated that such foam is totally ineffective as an extinguisher of such fires as are produced by burning alcohols, esters, ketones, ethers, acetones and other such combustible organic liquids.

From tests which have been conducted, I have observed that the ordinary foam produced by the use of acid and basic reagents and the usual foam stabilizer ingredient, such as extract of licorice and the like, when applied to an alcohol or other organic liquid fire almost immediately sinks to the bottom of the liquid at the same time that a large portion of the foam is more or less disintegrated and broken up, due to the action of such liquid upon the foam. The sinking of the foam to the bottom of the liquid is believed to be due not only primarily to the fact that organic liquids, like the alcohols, are of such character that some action takes place between the alcohol and the foam ordinarily employed which results in the breaking down of the ordinary stabilized foam.

It is among the objects of this invention to provide a fire-extinguishing foam-forming composition which is highly effective as an extinguisher of alcohol fires and the like; which is capable of producing foam which will not be materially affected by alcohol and other such organic liquids and which will float freely upon the surface thereof in such quantities as to produce an effective foam blanket for smothering and so extinguishing the fire; and which is adapted to be handled in exactly the same manner and by the same apparatus as is employed in connection with the production of ordinary foam for extinguishing oil and other fires.

A further object is to produce a fire-extinguishing foam-forming composition which provides for an increase in the surface viscosity, tensile strength and cohesive properties of the gas bubbles so that the mass thereof is less subject to disintegration.

Other objects and advantages of the invention will be apparent more fully hereinafter.

While in the following specification certain preferred embodiments of my invention are particularly described, it will be understood that my invention is not necessarily limited to the exact ingredients and proportions therein named.

In practicing my invention, I preferably select as the acid and basic foam-forming ingredients aluminum sulphate and bicarbonate of soda, it being well-known that when these chemicals are combined in water there is produced in considerable quantity gases which are non-supporting to combustion. Preferably, these foam-forming reagents are in the form of dry powders which are adapted to be mixed together for introduction into a single stream of water or they may be separably introduced into separate streams which are subsequently merged to produce the desired reaction. If it is desired, however, the acid and basic reagents may be initially prepared in the form of solutions which may be separately piped to the point of the fire and there combined to produce the fire-extinguishing gas. In addition to the foregoing, my invention is, of course, applicable for use in connection with any suitable mechanical means or apparatus, such as chemical engines, hand extinguishers and the like, wherein provision is made for maintaining the foam forming ingredients in condition for common introduction into the water stream or in the form of preliminarily prepared solutions for mixture together to produce the foam as the necessity arises for the production thereof It has long been known that when such foam, stabilized by the use of ordinary foam stabilizers, such as extract of licorice or oak bark, is applied to the surface of an organic liquid, like alcohol, it immediately sinks below the liquid surface in consequence of which such foam is rendered ineffective to extinguish the flames rising from the liquid surface. Investigation of the problem has revealed that this action of ordinary stabilized foam when applied to the surface of organic liquids is due primarily to the fact that the adhesive force of the latter at its interface is so much greater than the cohesive force between bubbles of the foam mass that such bubbles are drawn toward and into the liquid with resultant disintegration of the bubbles and destruction of the foam as a fire-extinguishing medium. Moreover, the envelopes of the ordinary stabilized foam bubbles are so wetted by the organic liquids that the surface viscosity and tensile strength thereof are decreased to the point where the bubbles no longer are able to resist collapse.

I have discovered that by employing a stabilizer compounded from a mixture of an oxidizing alkali metal salt or other suitable oxidizing agent and a fatty acid soap, fire-extinguishing foam may be produced which is exceedingly effective to extinguish fire produced by burning organic liquids, such as alcohols, acetones, ethers, organic esters and the like. Preferably, I prepare the foam stabilizer of the present invention as follows:

First, a concentrated aqueous solution of potassium permanganate is prepared employing approximately ten pounds of the latter ingredient.

Second, approximately forty pounds of a fatty acid soap is mixed with twenty gallons of water, preferably heated to approximately 100 degrees F.

Third, the potassium permanganate solution is then added to the fatty acid soap mixture while the latter is still warm, the resultant mixture being thoroughly stirred until such time as all exothermic reaction has subsided in the mixture, whereupon it is drawn off and permitted to cool and solidify into a mass of lard-like consistency.

Fourth, the solidified mass may then be dried and ground for use as a dry-powdered stabilizer in those cases where the acid and basic foam-forming reagents are introduced in dry, powdered form into flowing streams of water, or it may be employed in its solidified form for introduction as a foam stabilizer into tanks containing solutions of the acid and basic foam-forming reagents.

In cases where the acid and basic foam-forming ingredients, which are usually aluminum sulphate and sodium bicarbonate, are in the form of finely comminuted dry powders, it is, of course, preferable to also finely comminute the stabilizer as above prepared, and while the proportions of the foam-forming composition may be varied within relatively wide limits, without seriously affecting the effectiveness of the composition, I have found it preferable to employ in any given charge approximately 85% by weight of sodium bicarbonate and 15% by weight of the stabilizer to form the basic foam-forming agent. The acid foam-forming agent, which preferably consists of aluminum sulphate or other such suitable acid reagent, is substantially equal in weight to the basic foam-forming agent.

In place of potassium permanganate, sodium permanganate may be employed in the above formula, while the fatty acid soap therein referred to may be either of vegetable or animal origin and may be replaced by any other substance containing a high proportion of fatty acid. It will be understood, of course, that the proportions above stated may be varied within limits and are only approximate and that the temperature of the fatty acid mixture is also approximate and may be varied as exigencies may require.

While it is known that potassium permanganate acts definitely as an oxidizing agent and so undoubtedly has an oxidizing effect upon the fatty acid content of the mixture, as is indicated by the thermal reaction which takes place when the potassium permanganate solution is mixed with the fatty acid soap and water mixture, the mechanism of the reaction is not definitely known and accordingly no attempt is made herein to express definitely what reaction is obtained when the concentrated potassium permanganate solution is introduced into the fatty acid mixture. Rather, I merely venture the observation that it is because of the oxidizing effect of the potassium permanganate upon the fatty content of the mixture that the resultant lard-like mass obtained when the mixture is drawn off and cooled serves ideally as a stabilizer for foam. That this stabilizer very definitely increases the surface viscosity and tensile strength of the foam bubbles and tends to materially increase the cohesive force therebetween is quite evident and certain not only because the foam bubbles are more durable and resist collapse for a longer period than those of ordinary stabilized foam, but also because the foam is not disrupted by and does not readily sink below the surface of any organic liquid over which it may be applied, this latter characteristic being due undoubtedly to the fact that the cohesive strength of the foam bubbles is at least as great, if not greater than, the adhesive force of the organic liquid at its interface.

While the foam stabilizer composition of the present invention has been described hereinbefore as particularly applicable to the production of stabilized foam produced by chemically combining and reacting acid and basic foam-forming solutions, it will be understood that it is equally applicable to foam produced by any other method, such as mechanically, wherein a gaseous medium is entrained into a finely subdivided stream of liquid in the presence of a foaming agent or stabilizer. Also, it will be understood that foam stabilized in accordance with this invention is not confined in its application to extinguish only alcohol fires and the like but instead may be applied as an extinguisher for all such conflagrations as are effectively extinguished by ordinary stabilized foam, whether produced chemically or mechanically.

What is claimed as new and useful is:

1. A fire extinguishing composition comprising a foam producing substance and a foam stabilizer, the latter comprising fatty acid soap reacted with alkali metal permanganate.

2. A fire-extinguishing composition comprising a mixture of acid and basic foam-forming reagents and a water soluble stabilizer consisting of a fatty acid soap reacted with an alkali metal permanganate.

3. A fire-extinguishing composition comprising a mixture of acid and basic foam-forming reagents and a water soluble stabilizer consisting of a fatty acid soap oxidized by potassium permanganate.

4. A fire-extinguishing composition comprising a mixture of acid and basic foam-forming reagents and a water soluble stabilizer consisting of a fatty acid soap oxidized by sodium permanganate.

5. A fire extinguishing composition comprising a mixture of acid and basic foam-forming reagents and a water soluble stabilizer consisting of a fatty acid soap oxidized by an alkali metal permanganate.

6. A method for extinguishing or preventing fires of alcohol and other such inflammable organic liquids of high capillary characteristics, which comprises applying thereover a foam produced by the chemical reaction of acid and basic foam-forming reagents one of which includes a stabilizer consisting of a fatty acid soap reacted with an alkali metal permanganate.

7. A method for extinguishing or preventing fires of alcohol and other such inflammable organic liquids of high capillary characteristics, which comprises applying thereover a foam produced by the chemical reaction of acid and basic foam-forming reagents one of which includes a stabilizer consisting of a fatty acid soap oxidized by potassium permanganate.

8. A method for extinguishing or preventing fires of alcohol and other such inflammable organic liquids of high capillary characteristics, which comprises applying thereover a foam produced by the chemical reaction of acid and basic foam-forming reagents one of which includes a stabilizer consisting of a fatty acid soap oxidized by sodium permanganate.

9. A method of extinguishing or preventing fires of alcohol and other such inflammable organic liquids of high capillary characteristics, which comprises applying thereover a foam produced by the chemical reaction of acid and basic foam-forming reagents one of which includes a stabilizer consisting of a fatty acid soap oxidized by an alkali metal permanganate.

FISHER L. BOYD.